(12) United States Patent
Mohan et al.

(10) Patent No.: US 6,894,506 B2
(45) Date of Patent: May 17, 2005

(54) GRATING ARRAY PROCESSING METHODS AND APPARATUS

(75) Inventors: Paul L. Mohan, Novi, MI (US); James E. Poplawski, Ann Arbor, MI (US)

(73) Assignee: Veridian Systems, Ann Arbor, MI (US)

( * ) Notice: Subject to any disclaimer, the term of this patent is extended or adjusted under 35 U.S.C. 154(b) by 265 days.

(21) Appl. No.: 10/241,209

(22) Filed: Sep. 11, 2002

(65) Prior Publication Data

US 2003/0067307 A1 Apr. 10, 2003

Related U.S. Application Data

(60) Provisional application No. 60/322,217, filed on Sep. 14, 2001.

(51) Int. Cl.$^7$ .............................................. G01R 27/04
(52) U.S. Cl. ......................................... 324/637; 73/602
(58) Field of Search ............................ 73/602; 324/637

(56) References Cited

U.S. PATENT DOCUMENTS

| | | | |
|---|---|---|---|
| 3,805,596 A | * 4/1974 | Klahr ........................... | 73/602 |
| 4,173,007 A | * 10/1979 | McKeighen et al. .......... | 367/11 |
| 4,630,051 A | 12/1986 | Adams et al. .............. | 342/133 |
| 4,717,916 A | 1/1988 | Adams et al. .............. | 342/107 |
| 5,132,693 A | * 7/1992 | Werp .......................... | 342/179 |
| 2004/0073101 A1 | * 4/2004 | Chance ....................... | 600/322 |

* cited by examiner

Primary Examiner—Charles H. Nolan, Jr.

(74) Attorney, Agent, or Firm—Gifford, Krass, Groh, Sprinkle, Anderson & Citkowski PC (57) ABSTRACT

The spectral content of the interference response at a sensor array is taken into account and used to advantage in remote sensing or imaging an object or scene. The phase relationship between sensor elements is preserved, enabling the natural interference spectrum to be processed to generate a particular spatial response of the aggregate beam pattern. The method applies to diverse forms of broadband illumination or emissions including acoustic and electromagnetic radiation, and provides remote sensing capabilities linked to the sensor elements appropriate to the wavelength band of interest (e.g., acoustic, RF or optical). Since the relative geometry between the source, scene and sensing array is responsible for the generation of a desirable interference response, the source of illumination need only maintain a small degree of coherence (some finite correlation length), and can operate in a pulsed or continuous (CW) mode. For passive sensing, the method can be applied to emissions derived from the object/scene itself. The processing technique exploits specific frequency/time domain features of the interference response and can apply them to a number of useful purposes including: 1) remote imaging of a scene, 2) remote characterization of an object of interest and 3) characterization of an intervening media between a source and the sensor array.

48 Claims, 8 Drawing Sheets

Array size = 100
Element pitch = 0.3m
Pulse width = 5ms

GRATING ARRAY PROCESSING METHODS AND APPARATUS

REFERENCE TO RELATED APPLICATION

This application claims priority from U.S. Provisional Patent Application Ser. No. 60/322,217, filed Sep. 14, 2001, the entire content of which is incorporated herein by reference.

FIELD OF THE INVENTION

This invention relates generally to remote sensing and, in particular, to apparatus and methods which exploit local interference effects that occur when an array of sensing elements receives energy reflected from an object or scene.

BACKGROUND OF THE INVENTION

A diverse range of techniques and methods occupy the field of remote sensing. These methods employ both passive and active systems to provide a representation of the scene or object of interest and can exploit acoustic as well as electromagnetic energy as a source of illumination. Some systems employ real apertures, in which the active sensor dimensions are limited to the physical extent of a single sensor. Other systems use synthetic apertures, which derive much larger effective sensor dimensions through either 1), motion of a single sensor across an extended distance or 2), the distribution of multiple, discrete sensor elements across an extended area.

Whereas the directionality of a single, stationary antenna or sensor is essentially fixed, interesting properties may be obtained using multiple send/receive elements, particularly when arranged in an array pattern. With particular regard to antenna technology, traditional methods of producing a movable beam usually involved physically rotating a directional element. With a fixed array of antenna elements, however, beam forming may be used to generate a highly directional signal without any moving parts. This may also allow the direction of radiation pattern to change quickly or even broadcast in several directions at once.

Conventional beam forming processes steer the equivalent main lobe of the sensor array to achieve directional orientation. Certain beam-forming processes exploit interference effects, but the phase delays of the individual sensor elements are arbitrarily controlled to force a preferred overall sensing angle and beam width. The returned energy level $|B(t,\theta,\phi)|^2$ for a given sensing direction $(\theta,\phi)$ is the primary data of interest. The field of view must be scanned to build up a spatial profile of the scene.

SUMMARY OF THE INVENTION

This invention resides in a system and method called the grating-array approach that exploits the interference response of arrayed sensors. In contrast to conventional beam forming, the equivalent main lobe of a sensor array is not steered; instead, the spectral content of the interference response of the array is taken into account and used to advantage. In particular, the phase relationship between sensor elements is preserved, enabling the natural interference spectrum to be processed to generate a particular spatial response of the aggregate beam pattern.

According to the invention, the field of view does not need to be scanned to build up a spatial profile of the scene. Rather, the processing method uses the array to accept scene energy simultaneously from a broad angular aperture to develop and capture the interference spectrum that encompasses the area of interest. The scatter information (e.g., location) within the scene is essentially encoded in the spectral content of the interference response.

The method applies to diverse forms of broadband scene emission or illumination including acoustic and electromagnetic energy, and provides remote sensing capabilities linked to the particular physics of object/illumination interaction or object emission. In an associated manner, the sensor array is composed of sensing elements appropriate to the wavelength of interest (e.g., acoustic, RF or optical).

The relative geometry between the source, scene and sensing array is responsible for the generation of a desirable interference response that is specifically enabled and exploited by the disclosed processing method. As such, the source of illumination need only maintain a small degree of coherence (some finite correlation length), and can operate in a pulsed or continuous (CW) mode.

The processing technique exploits specific frequency/time domain features of the interference response and can apply them to a number of useful purposes including: 1) remote imaging of a scene, 2) remote characterization of an object of interest and 3) characterization of an intervening media between a source and the sensor array. The results derived from multiple processing cycles (using both fixed and/or time varying source locations) can be combined to enhance the quality of the derived information.

For near field applications, medical diagnostic imaging (akin to ultrasound) would be an applicable area of use exploiting acoustic energy. Far field remote sensing represents another area of application with standoff ranges of several hundred kilometers in both stripmap and stare-mode configurations. For strip-mapping, cross-track (angle) resolution could be provided by grating array synthesis while along track resolution could be provided by a real-beam pattern or by a variety of range compression methods. For stare-mode applications, grating array synthesis could be used by dwelling on the area of interest as the view angle migrates through some predetermined interval.

DETAILED DESCRIPTION OF THE INVENTION

Figure 1:
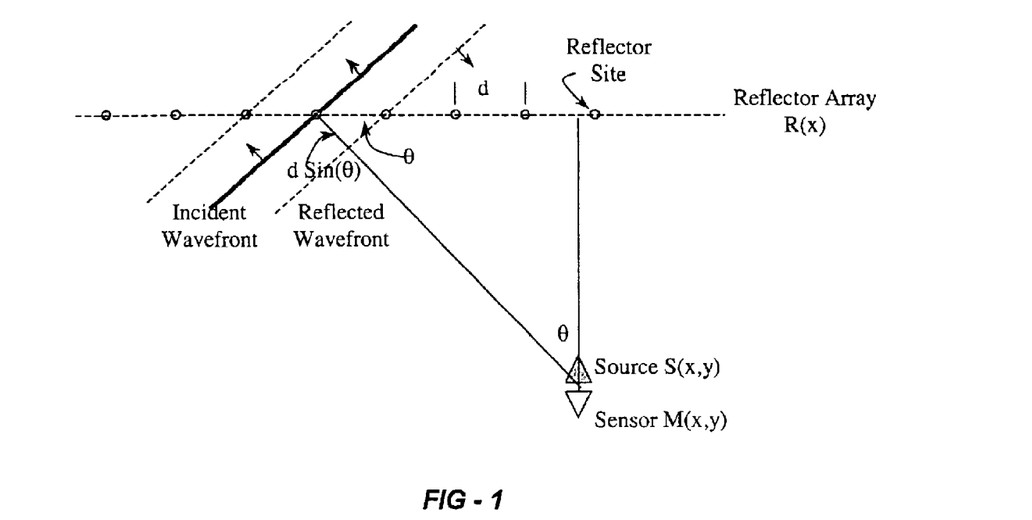
FIG. 1 shows a physical arrangement composed of a spatially periodic structure R(x) that provides regularly spaced reflector sites for incident illumination provided by source S(x,y)

FIG. 1 shows a physical arrangement composed of a spatially periodic structure R(x) that provides regularly spaced reflector sites for incident illumination provided by source S(x,y). Further, a suitable sensing element M(x,y) is shown that receives reflected energy from R(x). Although S(x,y) and M(x,y) are co-located in this example, this is not a requirement. For the case in which the illuminating energy source S(x,y) is provided by a broadband acoustic pulse and the sensing element a suitable microphone, interference effects in the form of chirped echoes are readily detected (Mohan[1] and Lubman[2]).

Figure 2:
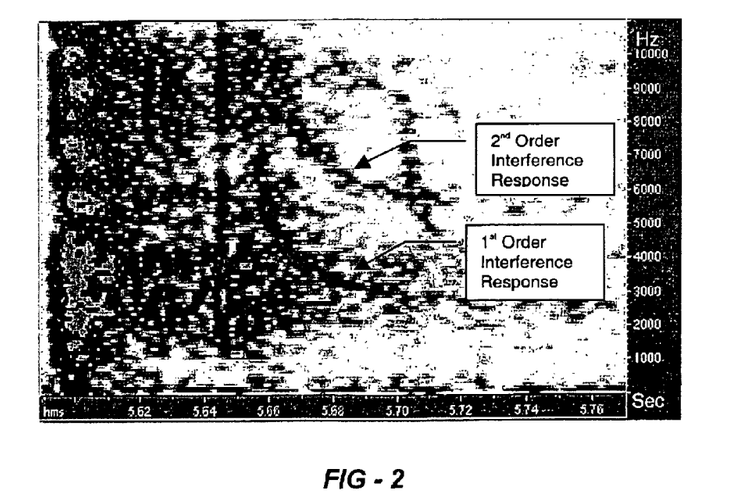
FIG. 2 provides an example of acoustic field data collected from a configuration similar to that shown in FIG. 1.

FIG. 2 provides an example of acoustic field data collected from a configuration similar to that shown in FIG. 1. The effects of interference processes within the received signal, collected by a single microphone, is evident in the time/frequency spectrogram. This data originated from a sound impulse reflected from a large section of a corrugated steel wall (Lubman reports similar responses derived from regular architectural features such as step structures). A key point to note here is that the microphone is effectively summing the multiple, delayed returns into a composite waveform. It is this summation that enables the interference process and effectively disperses the "input" acoustic impulse into a chirped echo as captured by M(x,y).

Figure 3:
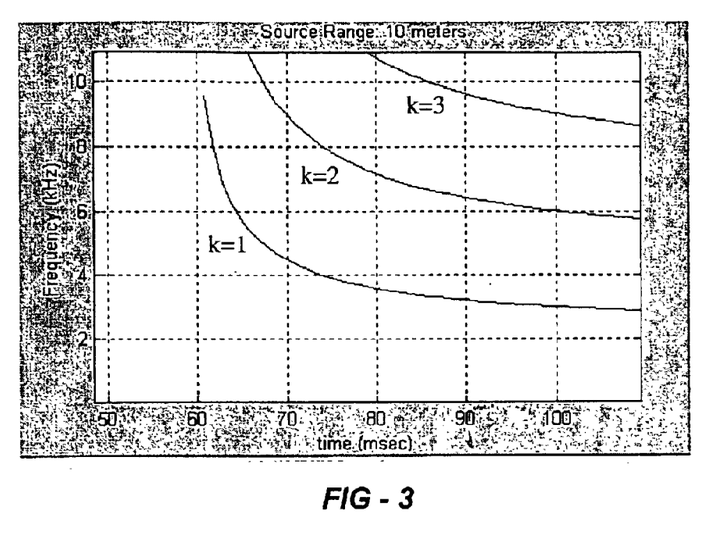
FIG. 3 depicts the first three interference modes associated with a geometry similar to that responsible for producing the data of FIG. 2.

By virtue of the reflector's periodicity, any given wavelength present in the illumination is preferentially reinforced at specific incident and reflection angles. For the case in which reflected energy is collected by a single sensor (denoted by M(x,y)), the geometry associated with a particular interference peak produces an associated time delay associated with that particular wavelength. The net effect, illustrated in the field record of FIG. 2, is to produce an interference response that is dispersed in time. By applying analysis methods similar to those used for diffraction gratings, one can readily predict the time and frequency interference response that will occur for a given geometry of the type shown in FIG. 1. FIG. 3 shows the results of one such model and depicts the first three interference modes associated with a geometry similar to that responsible for producing the data of FIG. 2.

Building from the previous discussion that a spatially periodic structure can induce local, and readily measured interference effects[3], we extend this concept to the key notion of the invention: that of a processing means that specifically enables and exploits the interference modes set up within a regular array of sensor elements. In this view, a regular array of sensing elements effectively serves the role of a grating structure. When the array receives reflected energy from a suitably illuminated object/scene (or emitted by the object/scene itself), interference effects occur when the N individual array responses, $M_j(t)$, are combined. This bears a direct analogy to the effects previously described and illustrated in FIGS. 2 and 3. Representing the summed array data R(t) as:

$$R(t) = \sum_{j=1}^{N} M_j(t)$$

We specifically note that artificial phase shifts are not applied to the individual sensor contributions. This is a key point of the general processing method in that:
1) We preserve the natural phase shifts imparted on each $M_j(t)$ by virtue of the relative positions of the object and array elements [the phase shift being related to the relative wavefront time delay seen by each sensor, $t_j=(j)(d)\sin(\theta)/v_p$].
2) We exploit the resulting interference spectrum within R(t).

Figure 4:
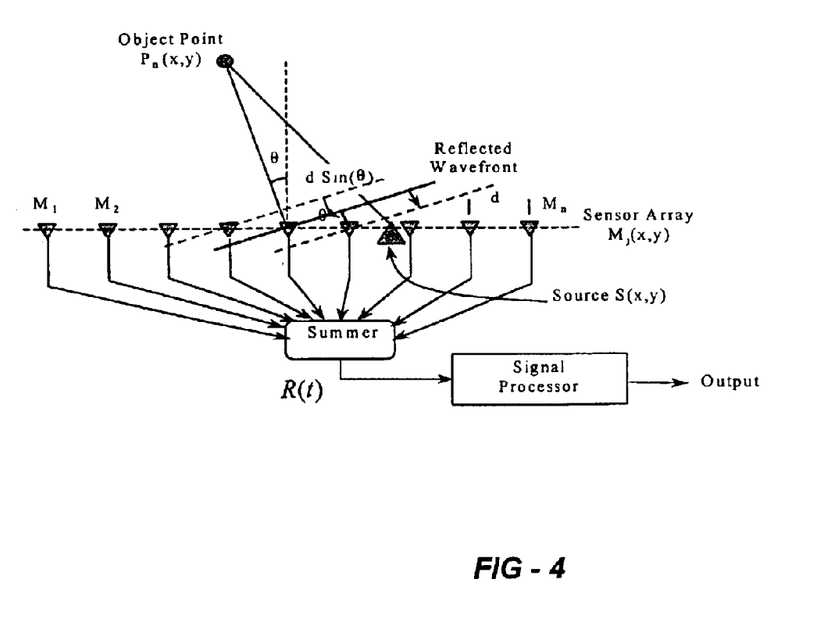
FIG. 4 shows a typical representation of a grating array processing method according to the invention.

FIG. 4 shows a typical representation of the disclosed grating array processing method. For simplicity, we limit discussion here to imaging in the x-y plane. A sensor array $M_j(x,y)$ comprising (N) regularly spaced sensing elements is positioned so as to receive reflected energy from the scene of interest (in this case object $P_i$). To enable the downstream interference process, the sensors must be of the coherent type (preserving phase) versus noncoherent power detectors. A source of illuminating energy $S_k(x,y)$ is also shown, and in this case a single source position is shown that is co-aligned with $M_j(x,y)$, though this alignment is not a necessary condition. A source of illumination is not required if the object emits energy of suitable bandwidth. A summing module combines the outputs of the individual sensor elements. For active illumination, two distinct approaches are distinguished by their use of either a wideband pulsed illumination source or a continuous wideband source.

Use of a pulsed illumination provides useful features for near-field applications in which the incident angle of the wavefronts impinging the sensor array changes appreciably over time. In these cases, one can exploit both the time and frequency domain behavior of the interference response. Modeling the configurations depicted in FIGS. 4 using pulsed illumination provides an understanding of the interference effects developed within the grating array processor. The required front-end signal processing is used to provide a continuous summation of the sensor array outputs. One useful model develops the idealized interference response observed at the summer output for a given sensor spacing, number of sensors, and object/source locations.

Figure 5:
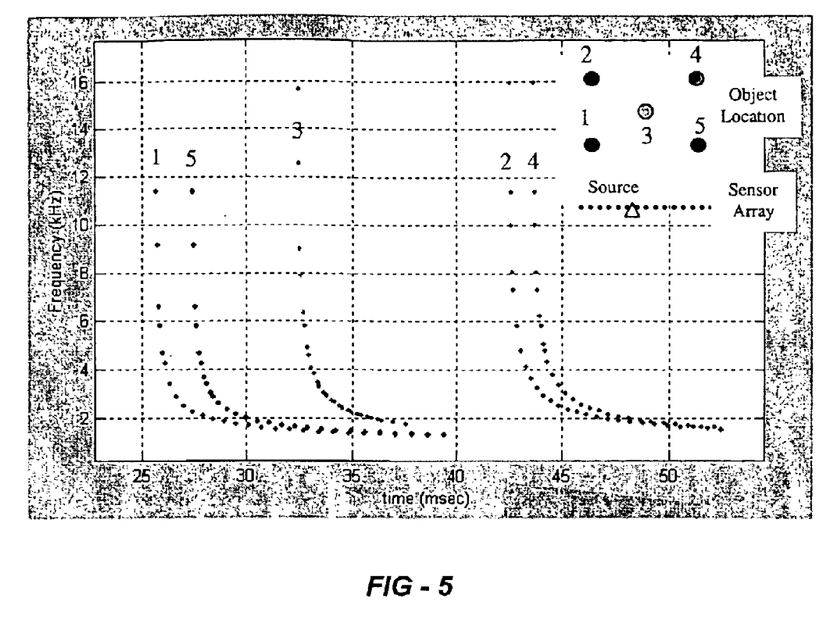
FIG. 5 shows a simulated, idealized interference response in time-frequency space for five targets in the scene.

FIG. 5 shows the results of one such model in time-frequency space. Each data point in the plots represents the derived frequency of a peak interference response ($f=v_p/\lambda_n$, where $k \cdot \lambda_n = d \cdot \sin(\theta)$) for a given sensor element and the associated time of its occurrence (dictated by overall path length). For the case illustrated in FIG. 5, five different objects were placed into the scene and acoustic illumination was used (propagation velocity $V_p=340$ m/s). In these simulations, the scene objects were modeled as Lambertian reflectors; that is, they scatter incident energy equally in all directions. The relative locations of the scene objects with respect to the sensor array and pulse source are shown in the insert of FIG. 5. The respective interference response derived from each object is included within the time/frequency representation. It is seen that the responses are grouped into characteristic chirps each representing the relative location of one of the objects. In the plots of FIG. 5, only the first-order interference responses are shown (k=1), and $\theta$ was greater than some minimum angle, $\theta_{min}$.

Figure 6:
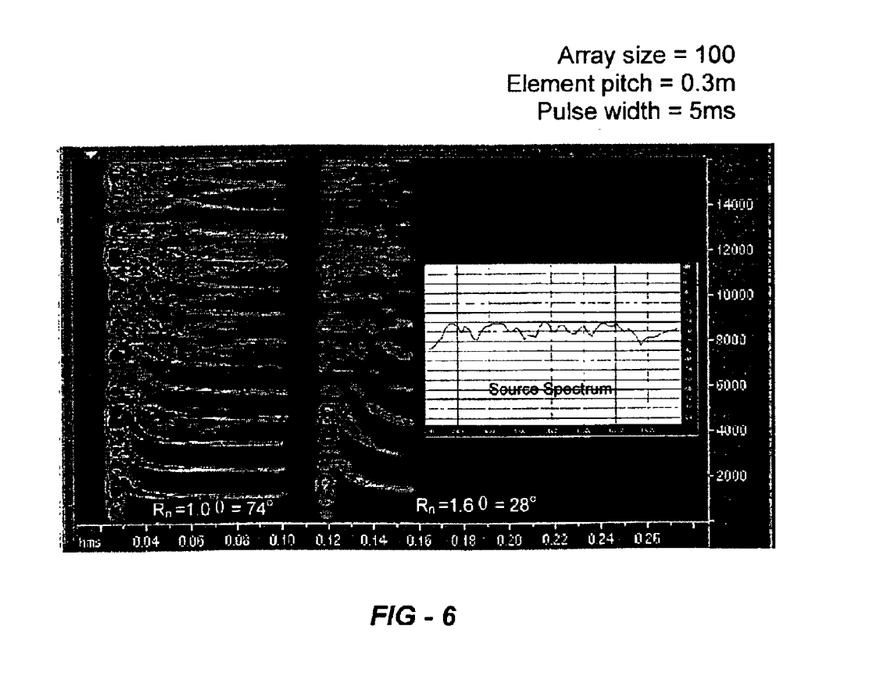
FIG. 6 illustrates a more typical interference spectrogram using a wideband acoustic pulse.

The results shown in FIG. 5 are instructive but are in essence deriving what the "ideal" interference response should be. A closer representation to a real-world interference spectrogram is shown in FIG. 6. This data was provided by a model that simulated an acoustic pulse interacting with two point reflectors in the scene and monitored by a linear array of sensor elements. Coherently summing the outputs of all the sensor elements enables the interference process and produces a data set with the time/frequency behavior shown in FIG. 6. These results depict an array of 100 elements with an element pitch of 0.3 meters. A 5 ms acoustic noise pulse provided the source illumination. The relative object ranges ($R_n$) and aspect angles ($\theta$) for two targets are shown. Following the initial transient, an angle ($\theta$) dependent and deterministic grating interval ($\Delta f$) can be noted.

The above discussion provides a physical basis for the methods underlying the grating-array approach. Here, we will develop and investigate the generalized transfer function for the Grating Array. The Grating Array is a specific form of a uniform linear array (ULA) in which the electrical path length from each sensor element to the summing node is equal. This analysis provides the means to explore the system-level parameter space and guide approaches to exploit the interference response of the array. Exploiting the response (for example, determining angle of arrival within a specified resolution) will call for specific processing operations. Initial results in this area will be described, followed by likely applications of the technology.

Let a(t) represent a baseband source signal being emitted or reflected from a target at t=0 and $\omega_0$ be its carrier frequency. The received signal s(t) formed by the summing of the outputs of a ULA is:

$$s(t) = \sum_{n=1}^{N} w_n a(t - R_n/V) e^{j\omega_0(t - R_n/V)} \quad \text{Equation 1}$$

where N is the number of elements in the array, $w_n$ is the weight of the nth element, $R_n$ is the distance from the target to the nth element, and V is the velocity of propagation. After complex demodulation (i.e. multiplication by $e^{-j\omega_0 t}$), the signal is:

$$s(t) = \sum_{n=1}^{N} w_n a(t - R_n/V) e^{-j\omega_0 R_n/V} \quad \text{Equation 2}$$

Assuming the geometry shown in FIG. 4 with a target at $(R_t, \theta_t)$ and receiver elements spaced along the x-axis at positions $x_n$, one can substitute the equation $R_n = R_t + R_{\Delta,n}(\theta t)$ into Equation 2 and take the Fourier transform to get:

$$S(f) = A(f) e^{-j(\omega+\omega_0) \frac{R_t}{V}} \underbrace{\left( \sum_{n=1}^{N} w_n e^{-j(\omega+\omega_0) \frac{R_{\Delta,n}(\theta_t)}{V}} \right)}_{G(f)} \quad \text{Equation 3}$$

Since A(f) is the source signal, the rest of the expression in Equation 3 represents the transfer function of the ULA. The phase term outside of the parenthesis represents the delay from the target to the origin of the coordinate system and is therefore desirable to preserve. Therefore, the component of interest in the Grating Array transfer function is the one labeled as G(f) in Equation 3.

Considering G(f) in the time domain yields the intuitive result:

$$g(t) = \sum_{n=1}^{N} w_n \delta(t - R_{\Delta,n}(\theta_t)/V) \quad \text{Equation 4}$$

which represents the N different delayed versions of the transmitted signal present in the received signal.

Taking S(f) one step further, if the propagating signal is assumed to be a plane wave, then $R_{\Delta,n}(\theta_t) = -x_n \sin(\theta_t)$, where xn=(n-1)*d". Substituting this expression into Equation 3 gives:

$$S(f) = A(f) e^{-j(\omega+\omega_0) \frac{R_t}{V}} \underbrace{\left( \sum_{n=1}^{N} w_n e^{j(\omega+\omega_0) \frac{x_n \sin(\theta_t)}{V}} \right)}_{G(f)} \quad \text{Equation 5}$$

The expression for S(f) shown in Equation 5 suggests some possible processing options for extracting the position $(R_t, \theta_t)$ of a target. Before this is done, however, A(f) must be addressed. If A(f) is a deterministic signal, one may apply its matched filter, M(f)=A*(f), to the signal to remove any phase effects. If A(f) was a designed, coded waveform such as a linear FM or pseudorandom sequence, this matched filtering step serves as range compression. The desirable result in any case is for A(f)M(f) to have zero phase and either a constant magnitude or the amplitude of an appropriate weighting function with good time-domain characteristics. If A(f) is random, it may be desirable for M(f) to be a filter that either whitens the spectrum or "colors" it in some appropriate way.

Returning to how we might derive $(R_t, \theta_t)$, one method involves analyzing at the peaks of G(f). From Equation 5 it can be seen that G(f) is the sum of complex sinusoids whose frequencies in this domain are differentiated by the values of $x_n$. This sum periodically yields peaks of constructive interference, the spacing of which is dependent on $\theta_t$ and related as $\Delta f = v/(d^* \sin(\theta_t))$, where d is the element spacing and v is the propagation velocity. By analyzing the spacing of the peaks in the frequency spectrum of the Grating Array output, the angle of a target can be estimated. This could, for example, be done using a frequency domain correlation technique based on the known response of the Grating Array transfer function.

An alternate approach seeks to remove the effects of G(f) altogether. This approach starts with applying either the full or phase-only form of the matched filter of G(f) to the received array output. This serves to align all of the delayed receptions of the source signal and thus remove the effect of the varying distances from the target to the different receive elements. This step can be considered an "after-the-fact" beamformer, because the equivalent "steering" phase delays are being inserted after the array summation and not before. In practice, since $(R_t, O_t)$ is not known a priori, G*(f) must be generated for many possible values of $\theta$ with each one being applied to the combined array output in turn and the output examined. It is desired that in the time domain, $FT^{-1}(G(f, \theta_t) G^*(f, \theta))$ has a maximum when $\theta = \theta_t$. It is also desirable that this peak be narrow as a function of $\theta$ in order to achieve good angular resolution.

Figure 7:
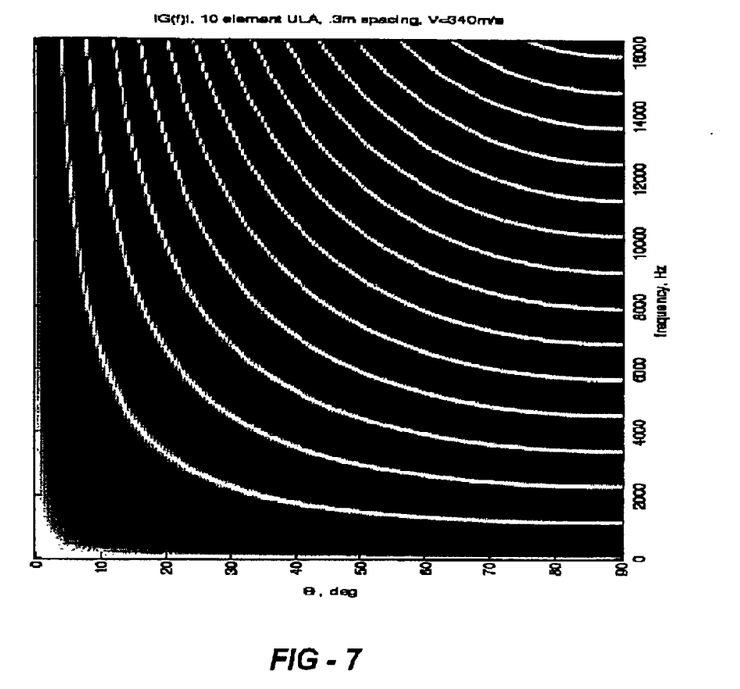
FIG. 7 shows $|G(f,\theta)|$ for a 10 element ULA with 0.3 m spacing and acoustic propagation (V=340 m/s)

At this point some actual examples of G(f) and its behavior are instructive. FIG. 7 shows $|G(f, \theta)|$ for a 10 element Grating Array with 0.3 m spacing and acoustic propagation (V=340 m/s). The peaks of constructive interference mentioned previously are clearly seen as the bright white arcs in the image.

Figure 8:
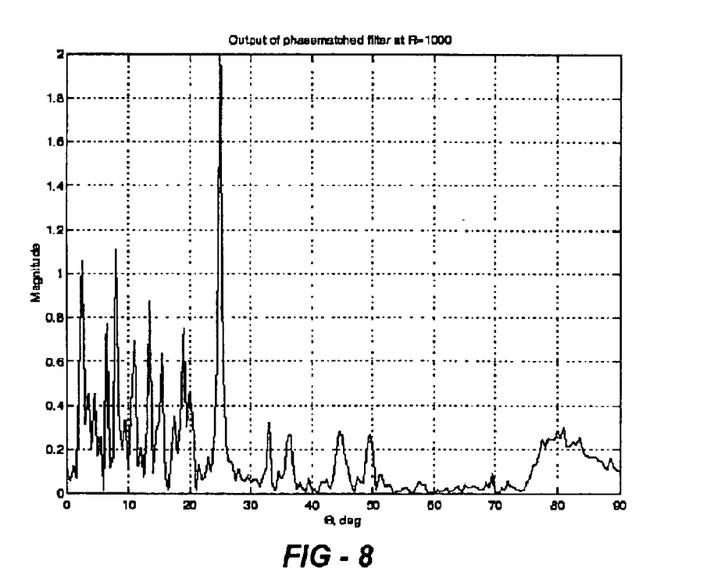
FIG. 8 shows the time domain output of this filtering step as a function of $\theta$ for the range bin corresponding to R=1000 m.

A received signal d(t) was simulated for this array with a target at $(R_t, \theta_t) = (1000 \text{ m}, 25°)$ and the assumption that A(f)=1. The phase of G*(f, θ) was computed for many values of θ and this filter was applied to d(t). FIG. 8 shows the time domain output of this filtering step as a function of θ for the range bin corresponding to R=1000 m. There is a sharp peak at θ=25° which is good, but there are clearly many other spurious peaks with significant energy which could cause problems or mask other targets if any were in the scene.

Figure 9:
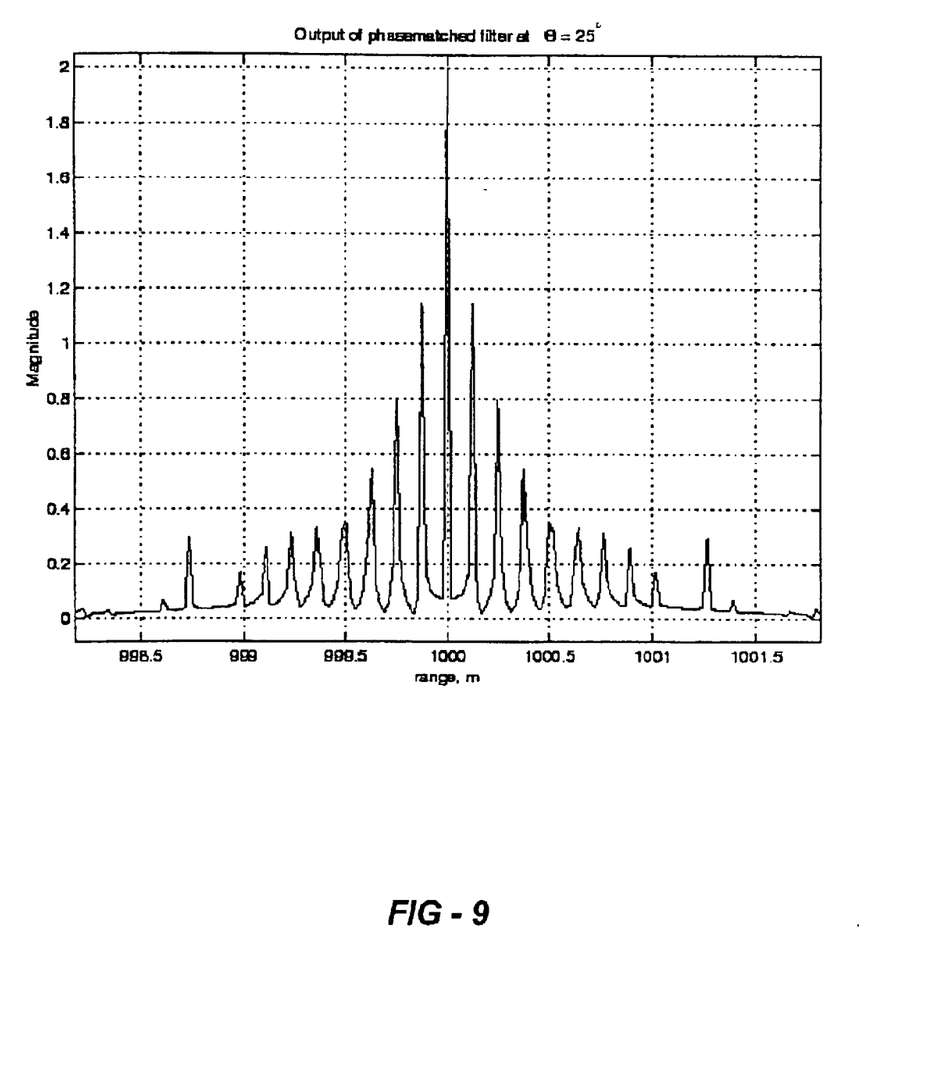
FIG. 9 shows the time-domain output of the filtering step as a function of range for $G^*(f, 25°)$.

FIG. 9 shows the time-domain output of the filtering step as a function of range for G*(f, 25°). The tallest peak is at the proper range, but there are large spurious peaks in this dimension as well which would cause problems in a scene with multiple targets. The extra peaks in range are the result of the periodic peaks in G*(f,θ).

Figure 10:
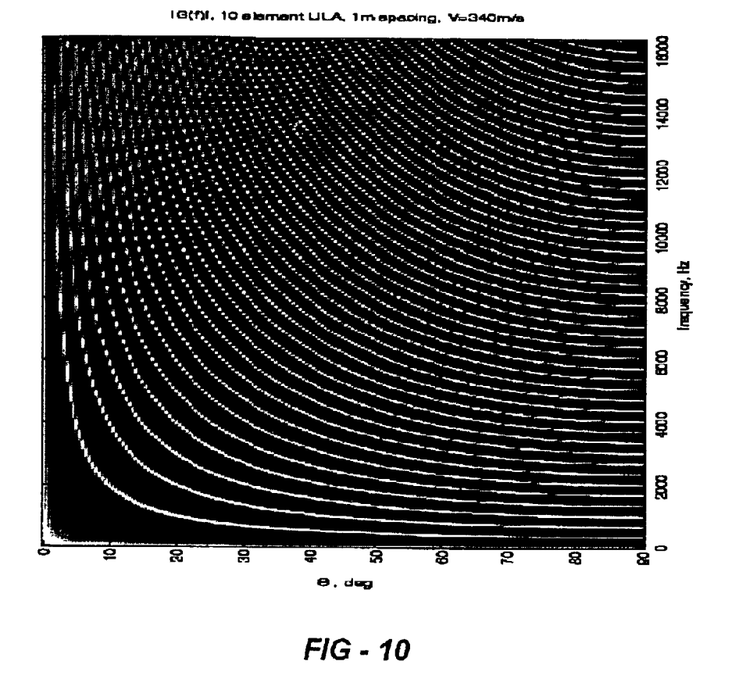
FIG. 10 shows $|G(f,\theta)|$ for a different ULA layout with 10 elements spaced 1 m apart.
Figure 11:
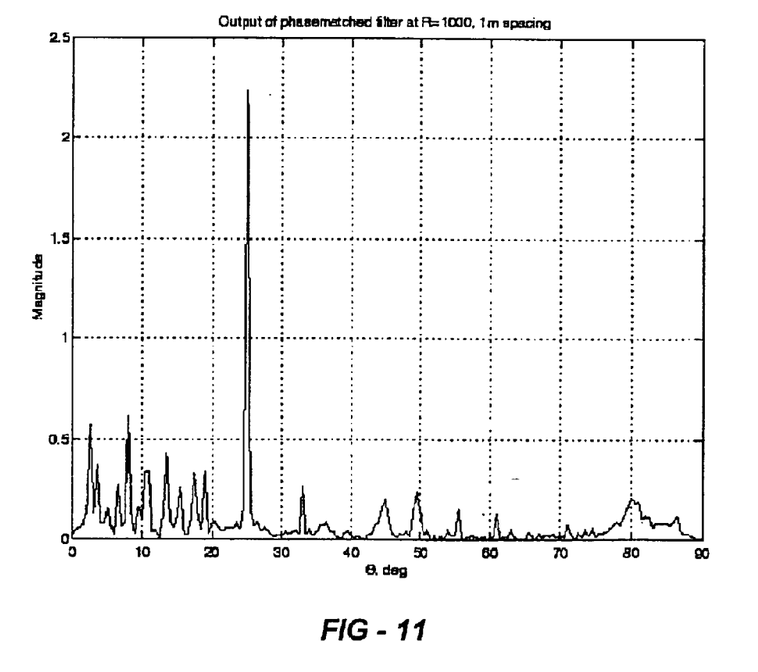
FIG. 11 is comparable to FIG. 8 using the layout of FIG. 10.
Figure 12:
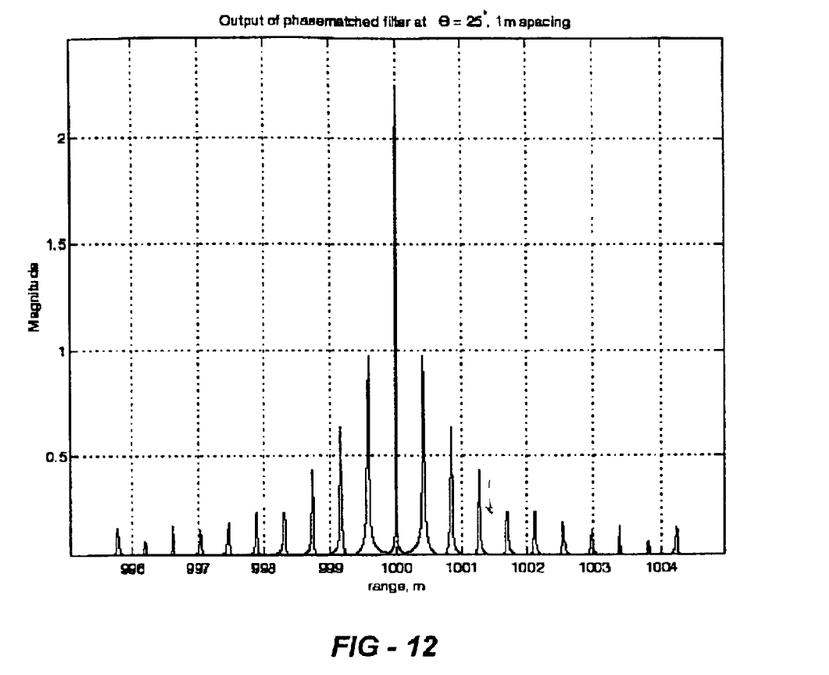
FIG. 12 is comparable to FIG. 9 using the layout of FIG. 10.

The results in FIGS. 7, 8, and 9 show some promise, but also some areas for improvement. FIG. 10 shows |G(f,θ)| for a Grating Array with 10 elements spaced 1 m apart. Since the array spacing went up by approximately a factor of 3, the number of constructive interference peaks for a given range of θ values also increases by a factor of three. FIG. 11 is comparable to FIG. 8 for this new case. The spurious peaks are still seen, but their energy is reduced. Similarly, FIG. 12 is comparable to FIG. 9 for the new case. The spurious peaks are still seen on this plot as well, but their energy has been reduced somewhat and they are spread further in range, increasing the element spacing improved the filtering results.

Figure 13:
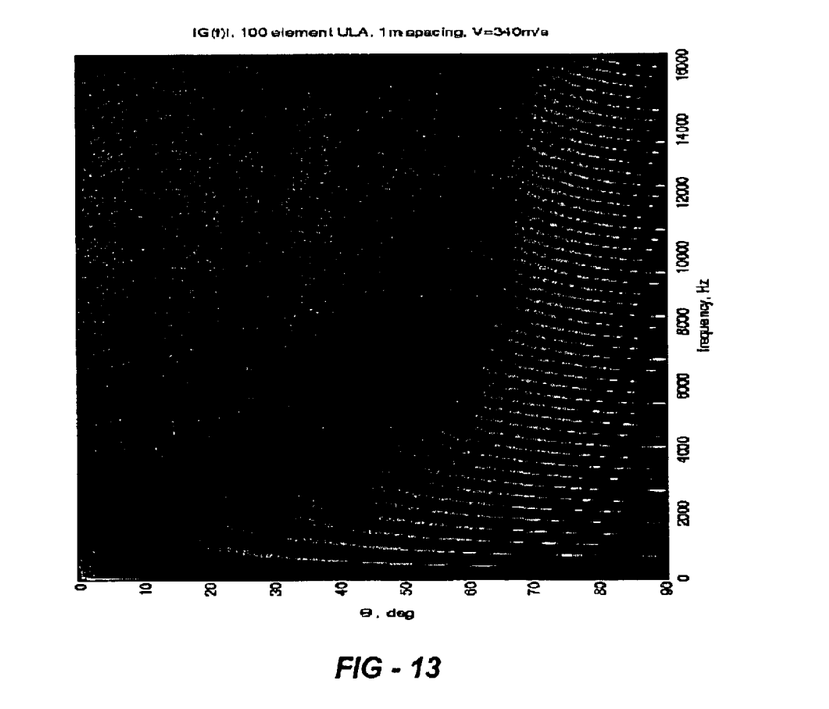
FIGS. 13, 14, and 15 illustrate an alternative configuration evaluated using a 100 element ULA with 1 m spacing.
Figure 14:
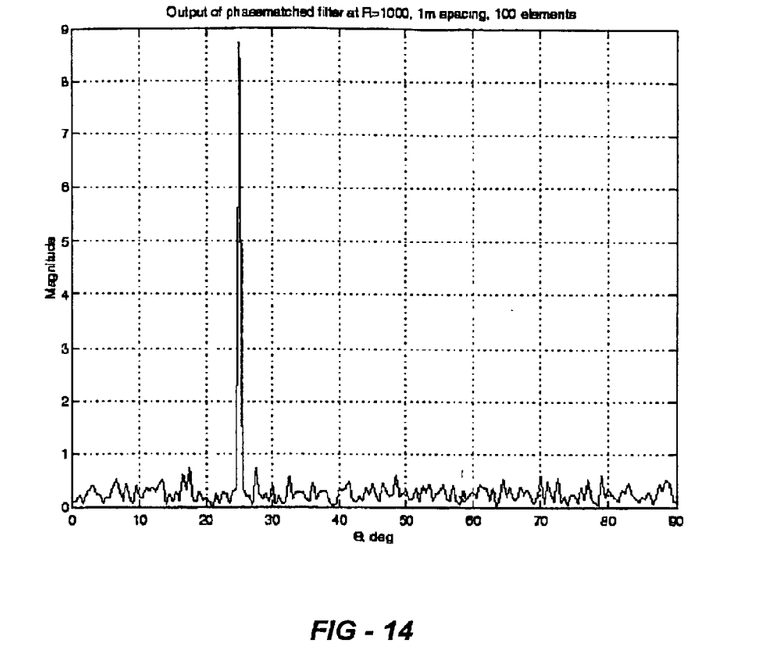
Figure 15:
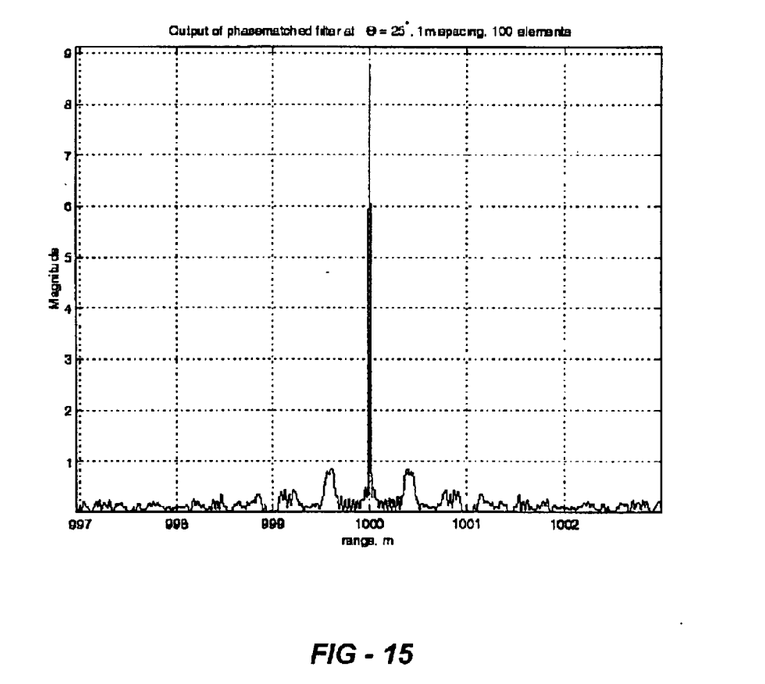

For a 100 element ULA with 1 m spacing, FIGS. 13, 14, and 15 illustrate the same three plot types as were created for the previous cases. The plot of |G(f,θ)| is interesting because the peaks of constructive interference have spread into each other as a function of frequency for a large range of θ, including θ=25°. This is actually a beneficial effect because |G(f, θ)| looks more uniform or "noise-like" which serves to remove the extra time (range) peaks seen for the previous two cases. The result is that FIGS. 14 and 15 show a well isolated peak at the proper (range, angle) position.

The reason that the phase-matched filter output as a function of angle is improved by increasing the array spacing is fairly intuitive. When the array elements are far apart, a small change in angle yields large changes in range to the individual elements. As soon as the differential range between the elements is larger than the range-compressed pulse width, the multiple copies of the source signal do not overlap and thus cannot reinforce each other the way they do when the correct phase-matched filter lines them up perfectly.

The results set forth above indicate that it is possible to obtain spatial localization of a target from a 1-D data vector created by the coherent sum of the outputs of a ULA. The initial processing technique may be extended to multiple target cases up to and including a full clutter scene (with appropriate noise models). Depending upon the application, one or more of the following degrees of freedom may be optimized: number of array elements, element spacing, element weighting, and frequency bandwidth. Two dimensional arrays and non-uniformly spaced arrays may also be considered.

The application of the invention holds promise for developing potentially new methods of remote imaging. For near field applications, medical diagnostic imaging (akin to ultrasound) would be an applicable area of use exploiting acoustic energy. Far field remote sensing represents another area of application. Here, standoff ranges of several hundred kilometers could be typical. In these applications, one could envision both stripmap and stare-mode configurations. For strip-mapping, cross-track (angle) resolution could be provided by grating array synthesis while along track resolution could be provided by a real-beam pattern or by a variety of range compression methods. For stare-mode applications, grating array synthesis could be used by dwelling on the area of interest as the view angle migrates through some predetermined interval. Images would be formed by building target angle position as energy is integrated and processed over the aperture. This approach permits longer integration times that should improve sensitivity and resolution capability.

The inherent broad band processing that can be used in the Grating Array methods further offers the potential for obtaining higher sensitivity. In radiometric applications, this sensitivity is termed ΔT and is proportional to $$\frac{1}{\sqrt{B\tau}}$$

where B is the bandwidth and τ the integration time.

Table 2 lists a range of application domains that could apply grating array processing technique. The wavelength and frequency bands shown are those of the first order interference mode at a particular aspect angle. Note that both acoustic and radio (EM) propagation apply equally well since their absolute wavelengths are similar. At a system level, the wideband illumination source could be under direct control, could be derived from an external source of opportunity and exploited for use by the system or could be provided by the object/scene under investigation itself.

TABLE 2

| Energy Source | Media | $V_p$ m/sec | Sensor Pitch (m) | $\lambda_{70}, \lambda_{10}$ (m) | $f_{70}, f_{10}$ (Hz) | Band |
|---|---|---|---|---|---|---|
| Acoustic | Air | 340 | 0.07 | .0657 .0121 | 5169 27971 | Sonic/ Ultra-sonic |
| Acoustic | Water | 1469 | 10 | 9.39 1.736 | 156 846 | Sonic |
| Acoustic | Water | 1469 | .002 | .00188 .00035 | $781 \times 10^3$ $4.23 \times 10^6$ | Ultra-sonic |
| EM | Air/Vacuum | $3 \times 10^8$ | 1 | 0.934 0.173 | $319.3 \times 10^6$ $1728 \times 10^6$ | Microwave (UHF) |
| EM | Air/Vacuum | $3 \times 10^8$ | 0.001 | $9.4 \times 10^{-4}$ $1.74 \times 10^{-4}$ | $.319 \times 10^{12}$ $1.73 \times 10^{12}$ | Tera Hz |
| EM | Air/Vacuum | $3 \times 10^8$ | $100 \times 10^{-6}$ | $94 \times 10^{-6}$ $17.4 \times 10^{-6}$ | $3.19 \times 10^{12}$ $17.3 \times 10^{12}$ | Long IR |
| EM | Air/Vacuum | $3 \times 10^8$ | $2 \times 10^{-6}$ | $1.88 \times 10^{-6}$ $0.347 \times 10^{-6}$ | $1.59 \times 10^{14}$ $8.64 \times 10^{14}$ | Visible/ Near IR |

We claim:

1. A method of exploiting local interference effects in sensing or imaging a remote object or scene, comprising the steps of:
providing an arrangement of sensor elements;
receiving energy from the object or scene in the form of time-varying signals exhibiting a phase relationship due to the arrangement of the sensor element;
processing the time-varying signals to extract local interference effects based upon the phase relationships; and
using the local interference effects to obtain information relating to the remote object or scene.

2. The method of claim 1, wherein the arrangement is a regular array.

3. The method of claim 1, further including the steps of:
illuminating the object or scene with a source of energy; and
receiving reflected energy at the sensor elements.

4. The method of claim 1, wherein the energy is broadband.

5. The method of claim 1, wherein the energy exhibits at least a small degree of coherence.

6. The method of claim 3, wherein the source of energy is pulsed.

7. The method of claim 3, wherein the source of energy is continuous (CW).

8. The method of claim 3, wherein the source of energy is temporally fixed.

9. The method of claim 3, wherein the source of energy is time-varying.

10. The method of claim 1, wherein the step of processing the time-varying signals includes summing the signals.

11. The method of claim 1, wherein the local interference effects include frequency- or time-domain features.

12. The method of claim 1, wherein the arrangement includes the geometry between the source, scene and sensor elements.

13. The method of claim 1, wherein the information relating to the remote object or scene includes remote imaging.

14. The method of claim 1, wherein the information relating to the remote object or scene includes remote characterization.

15. The method of claim 1, wherein the information relating to the remote object or scene includes the characterization of an intervening media between the object or scene and the sensor elements.

16. The method of claim 1, wherein the time-varying signals are processed in multiple cycles to enhance the quality of the information.

17. The method of claim 1, wherein the energy received is electromagnetic.

18. The method of claim 1, wherein the energy received is acoustical.

19. The method of claim 1, wherein the energy received is optical.

20. A method of exploiting local interference effects in sensing or imaging a remote object or scene, comprising the steps of:
providing an array of sensor elements;
illuminating the object or scene with a source of energy;
receiving energy reflected by the object or scene in the form of time-varying signals exhibiting a phase relationship due to the layout of the array;
processing the time-varying signals to extract local interference effects based upon the phase relationships; and
using the local interference effects to obtain information relating to the remote object or scene.

21. The method of claim 20, wherein the source of energy is a broadband source.

22. The method of claim 20, wherein source of energy exhibits at least a small degree of coherence.

23. The method of claim 20, wherein the source of energy is pulsed.

24. The method of claim 20, wherein the source of energy is continuous (CW).

25. The method of claim 20, wherein the source of energy is temporally fixed.

26. The method of claim 20, wherein the source of energy is time-varying.

27. The method of claim 20, wherein the step of processing the time-varying signals includes summing the signals.

28. The method of claim 20, wherein the local interference effects include frequency- or time-domain features.

29. The method of claim 20, wherein the relative geometry between the source, scene and sensor array are specifically chosen to generate a desired set of local interference effects.

30. The method of claim 20, wherein the information relating to the remote object or scene includes remote imaging.

31. The method of claim 20, wherein the information relating to the remote object or scene includes remote characterization.

32. The method of claim 20, wherein the information relating to the remote object or scene includes the characterization of an intervening media between the object or scene and the sensor array.

33. The method of claim 20, wherein the time-varying signals are processed in multiple cycles to enhance the quality of the information.

34. A system for gathering information about a remote object or scene, comprising:
a plurality of sensor elements for receiving energy from the object or scene in the form of time-varying signals exhibiting a phase relationship due to the arrangement of the sensor element; and
a processor operative to extract local interference effects from the time-varying signals based upon the phase relationship of the energy received at the sensor elements and output information relating to the remote object or scene.

35. The system of claim 34, wherein the sensor elements form a regular array.

36. The system of claim 34, further including a source of energy for illuminating the object or scene.

37. The system of claim 36, wherein the source of energy is a broadband source.

38. The system of claim 36, wherein source of energy exhibits at least a small degree of coherence.

39. The system of claim 36, wherein the source of energy is pulsed.

40. The system of claim 36, wherein the source of energy is continuous (CW).

41. The system of claim 36 wherein the source of energy is temporally fixed.

42. The system of claim 36, wherein the source of energy is time-varying.

43. The system of claim 36, wherein the source of energy is electromagnetic.

44. The system of claim 36, wherein the source of energy is acoustical.

45. The system of claim 36, wherein the source of energy is optical.

46. The system of claim 34, wherein the information relating to the remote object or scene includes remote imaging.

47. The system of claim 34, wherein the information relating to the remote object or scene includes remote characterization.

48. The system of claim 34, wherein the information relating to the remote object or scene includes the characterization of an intervening media between the object or scene and the sensor elements.

* * * * *

UNITED STATES PATENT AND TRADEMARK OFFICE
CERTIFICATE OF CORRECTION

PATENT NO. : 6,894,506 B2  
DATED : May 17, 2005  
INVENTOR(S) : Paul L. Mohan

Page 1 of 1

It is certified that error appears in the above-identified patent and that said Letters Patent is hereby corrected as shown below:

Column 3,  
Line 23, insert -- Footnotes -  
[1]Mohan, P., Results of Independent Investigation, Nov. 2000  
[2]Lubman, D., "Archaeological Acoustic Study of Chirped Echo from the Mayan Pyramid at Chichen Itza", Acoustical Society of America - 136th ASA Meeting, Norfolk VA, Oct. 1998.  
[3]Exploiting spatial periodicity within a scene/object to be imaged is a technique that is readily applied in practice for imaging crystals (e.g. x-ray diffraction) and other regular structures. --.

Column 6,  
Line 53, replace "(Rt,Ot,)" with -- $(Rt, \emptyset_t)$ --.

Column 10,  
Lines 5 and 52, replace "wherein source" with -- wherein the source --.

Signed and Sealed this

Eighth Day of November, 2005

JON W. DUDAS  
*Director of the United States Patent and Trademark Office*